United States Patent [19]

Fricker et al.

[11] 4,258,521
[45] Mar. 31, 1981

[54] METAL FOIL INSULATION, ESPECIALLY FOR NUCLEAR REACTOR INSTALLATIONS

[75] Inventors: Peter Fricker, Freinsheim; Kuno Leyendecker, Neustadt; Jürgen Scharl, Ludwigshafen; Helmut Wagner, Heddesheim; Horst Wunsch, Heidelberg; Manfred Scholz, Erlangen, all of Fed. Rep. of Germany

[73] Assignees: Kraftwerk Union Aktiengesellschaft, Mülheim(Ruhr); Grunzweig & Hartmann und Glasfaser AG, Ludwigshafen, both of Fed. Rep. of Germany

[21] Appl. No.: 919,780

[22] Filed: Jun. 28, 1978
(Under 37 CFR 1.47)

[30] Foreign Application Priority Data

Jun. 30, 1977 [DE] Fed. Rep. of Germany ....... 2729453
Jul. 29, 1977 [DE] Fed. Rep. of Germany ....... 2734348

[51] Int. Cl.² ............................................. F16L 59/08
[52] U.S. Cl. .................................. 52/406; 165/135; 176/87
[58] Field of Search ............... 52/404, 406, 407, 808, 52/807, 806, 792–800; 165/135, 136; 156/292; 428/101; 176/87

[56] References Cited

U.S. PATENT DOCUMENTS

| 1,910,703 | 5/1933 | LeGrand | 52/407 |
| 1,910,703 | 5/1933 | LeGrand | 52/796 |
| 2,934,465 | 4/1960 | Ward | 52/406 |
| 3,296,059 | 1/1967 | Schwindt | 52/799 |
| 3,528,495 | 9/1970 | Armstrong | 176/87 |
| 3,958,714 | 5/1976 | Barriere | 52/792 |

FOREIGN PATENT DOCUMENTS

| 94968 | 9/1959 | Norway | 52/404 |
| 1029599 | 5/1966 | United Kingdom | |

*Primary Examiner*—John E. Murtagh
*Attorney, Agent, or Firm*—Herbert L. Lerner

[57] ABSTRACT

Metal-foil insulation formed of a multiplicity of substantially rectangular-shaped, air-enclosing metal foils disposed laterally adjacent and above one another and provided with spacers therebetween, the metal foils being packageable in thermally displaceable relationship into panels with connecting means for maintaining the foil in packaged condition, the panels, in turn being mutually alignable with sealable joints in a plurality of coordinate directions, includes bends formed in marginal zones of at least one side of an upper and a lower side of the metal foils in the respective panels, the bends having a shape and a shape elasticity such as to be deformable by a packaging force to a spacing between mutually adjacent metal foils determined by the spacers therebetween, the metal foils packaged into the respective panels being disposed with the bends thereof substantially linearly and sealingly engaging one another.

18 Claims, 10 Drawing Figures

METAL FOIL INSULATION, ESPECIALLY FOR NUCLEAR REACTOR INSTALLATIONS

The invention relates to metal-foil insulation, especially for nuclear reactor installations, and preferably for the heat insulation between the outer periphery of a reactor pressure vessel and the inner periphery of a biological shield, the insulation, more specifically, being formed of a multiplicity of substantially rectangular-shaped, air-enclosing metal foils disposed laterally adjacent and above one another and provided with spacers therebetween, the metal foils being packageable in thermally displaceable relationship into panels with connecting means for maintaining the foils in packaged condition, the panels in turn, being mutually alignable with sealable joints in a plurality of coordinate directions.

Metal-foil insulation of this general type has been disclosed heretofore in German Published Non-Prosecuted Application DE-OS 26 24 634. Sealing of the panel joints is accomplished therein by means of a lamination seal in the overlap zone of two respective adjoining panels. A cover sheet is furthermore provided for each panel on the side of the heat source, and the cover sheets of adjacent panels are always sealed by means of labyrinth seals formed of two interengaging or intermeshing folds. In this previously proposed metal-foil insulation, however, there are appreciable heat losses, nevertheless, due to so-called internal convection, since an upwardly-directed heat flow can develop in the interior of the panels between the individual metal foils. The respectively metal-foil stack is joined together to form a panel by fastening several spacers, respectively, by external screw connections to the internal screw connections of a preceding spacer, for the purpose of permitting thermal displaceability and so that the tolerances would not have to be made too narrow, the bores required therefor being given an oval shape, so that the foils are shiftable or displaceable within limits.

The prevent heat convection in the individual chambers and also to simplify the mechanical construction of such a thermal insulation, insulating elements in cassette form have become known heretofore (German Published Non-Prosecuted Application DE-OS 24 06 604) these cassettes being sealed on all sides and having at the edge thereof a step-shaped extension to permit suitable, advantageous assembly. These cassettes are formed of mutually parallel sheet metal panels which are provided with dents for spacing, the space within the cassette being under vacuum. In this heretofore known construction, it is a disadvantage that thick metal sheet must be used in order to prevent buckling, especially in view of the vacuum, so that only small elements can be manufactured in this manner of construction, the fastening and assembly of which is laborious, especially since through-bores for tie rods are provided for fastening, and the through-bores must be sealed from the rest of the cassette. In addition, the number of layers is limited because of the vacuum that is used, and furthermore, convection gaps are also provided within the cassettes because otherwise, the thermal stresses would become excessive.

An insulating element in cassette form has also become known heretofore (German Published Non-Prosecuted Application DE-OS 25 33 260), wherein a number of superimposed mutually spaced metal sheets is used, and each insulating element has an outer and inner cover as well as spacers for the metal sheets. The end faces of the insulating element form a step-shaped fold. It is a disadvantage of this heretofore known construction especially that large deformation forces occur in the event of thermal stresses due to the metal sheets that are used and, in addition, a considerable amount of material and, as a result, a heavy structure is required. Therefore, the abutments and suspensions therefor must also be strengthened, so that this type of construction has considerable technical and economic disadvantages.

It is further known from British Pat. No. 1,029,599 to seal panel elements in the edge or marginal zones thereof by introducing elastic strip elements. However, the spacings between adjoining metal foils are not fixed therein because the edge strip elements as well as the corrugated elements inserted as spacers between the individual metal foils are compressible or can flatten out. The panels therefore do not have the stiffness required if reactor pressure vessels of relatively large power rating, such as 1000MW$_{el}$, for example, are provided with insulation which, in individual tiers above one another, results in an insulation layer of considerable dimensions at the inner periphery of the biological shield. Past this insulation layer, flow cooling air streams of the reactor pressure vessel; this flow must, under no circumstances, excite the insulating panels to vibrations.

Finally, a thermal insulation has become known heretofore (U.S. Pat. No. 3,528,495) which is formed of several metal foils disposed side by side and provided with spacers, V-shaped strips being placed over respective pairs of adjacent metal foils for closing off the individual chambers at the top and bottom, so that the respective chambers are sealed. If several such panel elements are to be connected to each other, then X-shaped strips are put in place and the following panel element is placed thereon in a comb-like manner. While it is possible to provide with this construction, individual, tight chambers which are improved with respect to the reduction of convection flow, the manufacture thereof, nevertheless, requires a considerable amount of effort due, in particular, to an expensive spacer system, an upper connection to the respective adjacent panel element and a force introduction system when two elements are connected, which are required thereby.

It is therefore an object of the invention to provide a metal-foil insulation of the foregoing general type wherein not only the so-called internal convection within a panel and between adjacent panels is effectively prevented, but to do so in a manner that the individual panels form, in packaged condition thereof, a building block which can be produced inexpensively, can be installed easily and has, in the direction of the packaging, the required stiffness and dimensional stability, on the one hand, which make it suitable for a building block system and, on the other hand, ensures the required thermal displaceability of the individual metal foils. In particular, the individual panels per se are supposed to provide a prefabricated building block which is sufficiently convection-tight, so that only convection tightness or sealing between adjacent panels is necessary when the building blocks are installed at the biological shield.

Through the invention, a metal-foil insulation has been provided, by which the disadvantages and difficulties of the aforementioned metal-foil insulation types are avoided.

With the foregoing and other objects in view, there is provided, in accordance with the invention a metal-foil insulation formed of a multiplicity of substantially rectangular-shaped, air-enclosing metal foils disposed laterally adjacent and above one another and provided with spacers therebetween, the metal foils being packageable in thermally displaceable relationship into panels with connecting means for maintaining the foils in packaged condition, the panels, in turn being mutually alignable with sealable joints in a plurality of coordinate directions, comprising bends formed in marginal zones of at least one side of an upper and a lower side of the metal foils in the respective panels, the bends having a shape and a shape elasticity such as to be deformable by a packaging force to a spacing between mutually adjacent metal foils determined by the spacers therebetween, the metal foils packaged into the respective panels being disposed with the bends thereof substantially linearly and sealingly engaging one another.

The advantages attainable with the invention are seen particularly in the fact that, when the predetermined number of metal foils in packaged or joined together in a panel, the foils engage one another with prestressing of the edge or marginal zones thereof formed with the bends, and the sealing effect in the edge or marginal zone is preserved, therefore, under all temperature conditions. V- or X-shaped edge or marginal strip elements for sealing the respective panels are, therefore, no longer required per se. In principle, the sealing due to the bends on the upper side or lower side is sufficient for preventing internal convection; it is especially advantageous, however, to provide these seals on the upper as well as the lower side of the respective panel. Then, two convection barriers must be overcome from the top of one panel to the top of the panel disposed thereabove. Due to the fact that the elastic bends at the edge or margin are deformed during the packaging only to an extent that the metal foils tightly engage one another with the spacers thereof, especially stampings, assurance is offered that uniform dimensions of the individual panel building blocks will always be provided and that these building blocks will also have the necessary internal stiffness which makes them especially suitable for a building block system.

According to one preferred embodiment of the invention, the panels are constructed as cassettes and are closed for this purpose at a top side and/or bottom side thereof by a cover sheet and/or a bottom sheet, but are open at the sides thereof, the bends of the metal foils being disposed at the cover side and/or the bottom side; in the packaged condition, they can be brought into contact linearly sealingly with the inner sides of the cover sheet and/or the bottom sheet. This results in twice the number of sealing points i.e. the metal foils engage one another linearly not only with their seals, but they are also in contact linearly sealingly at the cover sheet and/or the bottom sheet. The foregoing with respect to the panel construction applies logically also to this cassette construction. In principle, a cover sheet or a bottom sheet already provides considerable further improvement in the thermal insulation; it is especially advantageous, however, to provide both a cover sheet as well as a bottom sheet. In that case four convection barriers are obtained in conjunction with the construction of the elastic metal foil edge or marginal bends on the cover side and the bottom side, for example, from the top of one cassette to the top side of the cassette disposed thereabove. By use of the term cassette, there is meant, an insulating body which has been obtained by packaging individual metal foils and which comprises, as compared to a panel, at least on one top side or bottom side thereof, a cover sheet or bottom sheet with which the elastic edge or marginal bends of the metal foils thereof are in sealing engagement. Preferably, as mentioned hereinbefore, this involves a construction which is provided with a cover sheet and a bottom sheet on the cover side as well as on the bottom side. At the sides i.e. in the case of a reactor insulation, at the lateral surfaces, the normals of which point in the circumferential direction, such a cassette can be made open; in a preferred embodiment, the cassettes are equipped on one of the elongated sides with protruding or projecting foil edges and on the opposite elongated side thereof, with foil pockets in such a manner that the protruding or projecting foil edges of the one cassette extend into the foil pockets of an adjacent cassette. This forms thermally elastic labyrinth seals. If the cassettes are aligned in this manner in circumferential direction and are also stacked on top of one another, horizontal joints are disposed between the mutually superimposed cassette, which are advantageously to be disposed offset from layer to layer with the gaps extending axially parallel and radially to the longitudinal axis of the pressure vessel. To seal these joints or gaps, which are formed between cassettes adjacent one another in vertical direction, there is provided, in accordance with a further embodiment of the invention, that the closing sheets of the cassettes on the front side and/or the rear side alternatingly and sealingly interengage one another with protruding or projecting sealing edges and U-shaped receiving pockets accommodated thereto. Advantageously, elastically deformable corrugated-sheet inserts are introduced into the aforementioned horizontal gaps.

Other features which are considered as characteristic for the invention are set forth in the appended claims.

Although the invention is illustrated and described herein as embodied in metal-foil insulation, especially for nuclear reactor installations, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
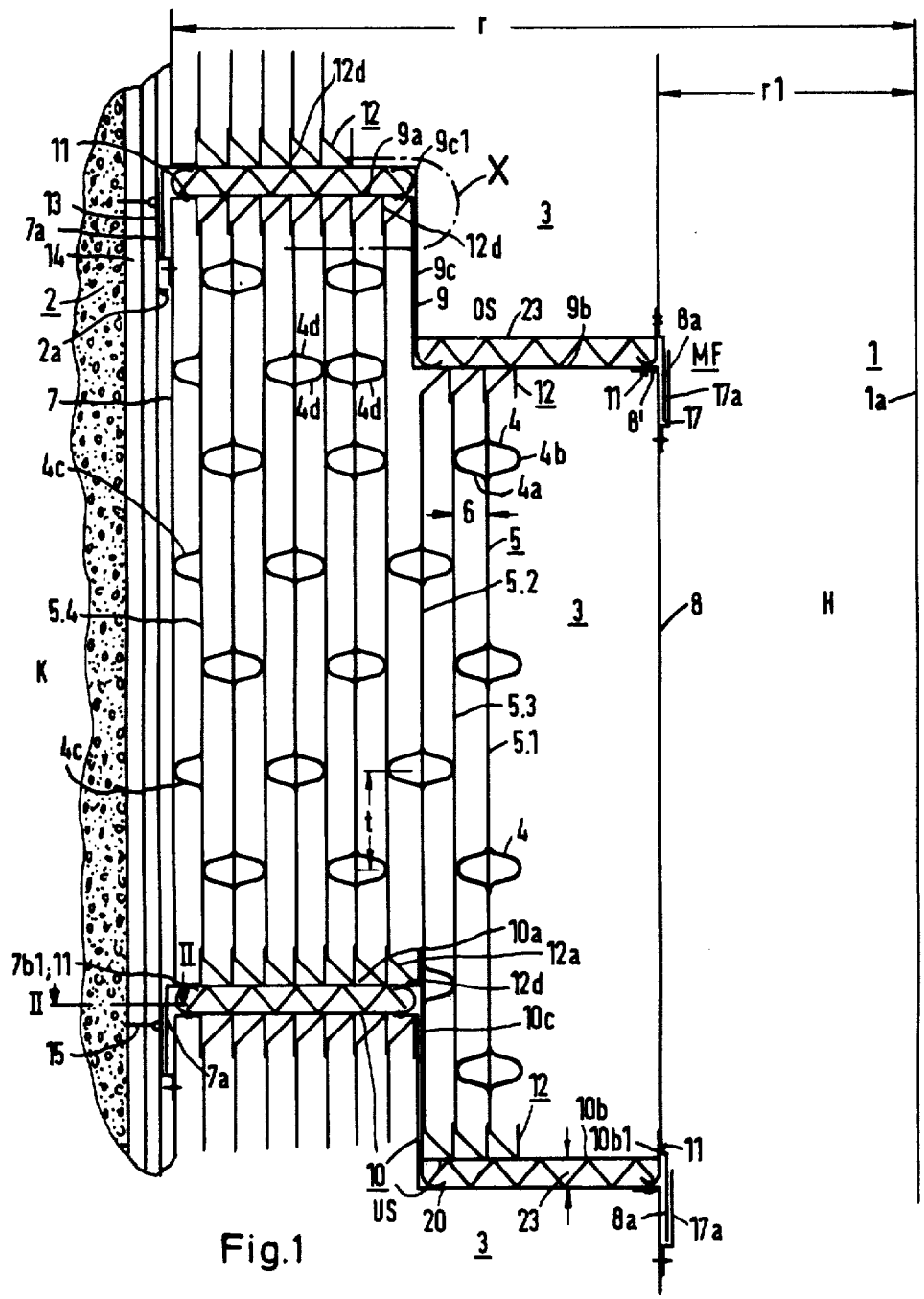
FIG. 1 is an elevational view, partly in cross section, of three cassettes which are arranged on top of each other and are fastened at the inner periphery of the biological shield of a reactor pressure vessel; only a section of the lowest and uppermost cassette being shown (first embodiment)

Referring now to the drawing and first, particularly, to FIG. 1 thereof, there is shown a metal-foil insulation generally identified as MF which serves as thermal insulation between the outer periphery $1a$ of a cylindrical reactor pressure vessel 1, on the one hand, and the inner periphery $2a$ of a biological shield generally identified as 2, on the other hand. The biological shield 2 is constructed as a substantially cylindrical hollow prestressed concrete body which surrounds the reactor pressure vessel 1 with an annular gap r. In addition, the biological shield 2 has a non-illustrated bottom structure, and in the gap between this bottom structure and the likewise non-illustrated bottom calotte of the reactor pressure vessel 1, metal-foil insulation MF is also provided.

Figures 5, 6:
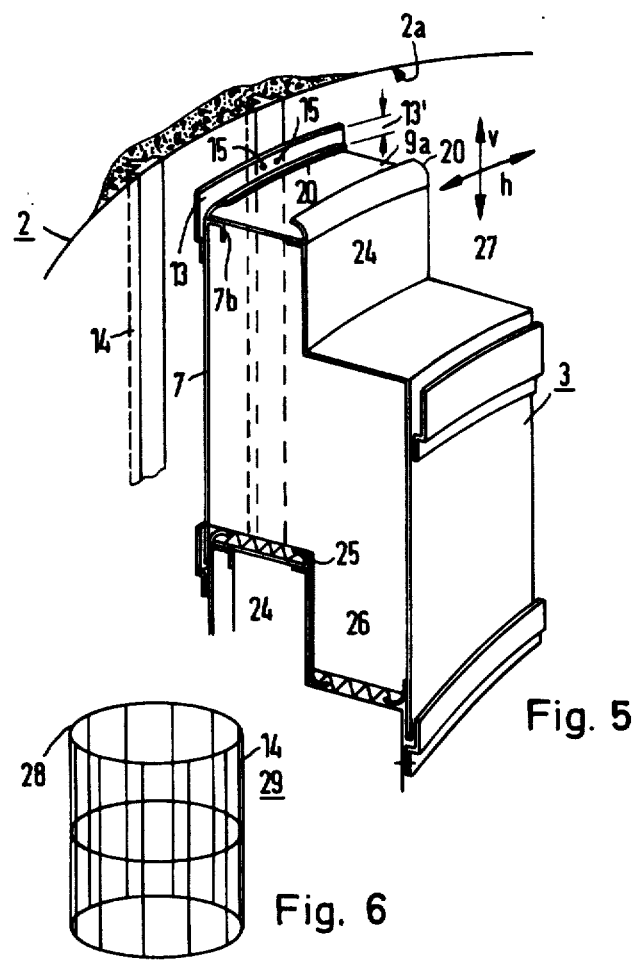
FIG. 5 is a perspective view, reduced in size, of FIG. 1, showing individual cassette fastened to mounting rails which are embedded in the inner periphery of the biological shield.
FIG. 6 is a greatly simplified perspective view of a mounting cage for the metal-foil insulation, the cage being formed of the individual mounting rails and the ring rails connected thereto, and which is anchored to the biological shield at the inner periphery of the latter.

The metal-foil insulation MF is formed of a multiplicity of building-block cassettes 3 which are lined up, as shown, on top of each other and side by side in circumferential direction to form a metal-foil insulation MF covering the entire inner periphery $2a$ of the biological shield 2. The same alignment applies to the bottom region of the biological shield 2. Such a cassette 3 constitutes a special type of panel formed of several metal foils 5 of approximately rectangular shape which are disposed side by side and on top of each other, are air-enclosing and are provided with spacers 4. The spacers 4 are formed as double-sided stampings $4a$, $4b$; the stampings $4a$, of the metal foil 5.1, oriented in one direction, while indeed being located on the same level line, are at a location of the circumference that is different from the location of the stampings $4b$ of the adjacent metal foil 5.2. Between the metal foils 5.1 and 5.2 which are provided with the stampings (the stampings being offset from one another therebetween by a division t) flat or planar metal foils 5.3 are seated. As mentioned hereinbefore, the stampings $4a$, $4b$ serve for spacing, so that a distance 6 is provided between adjacent metal foils 5. It is also possible to provide the stampings only on one side of the metal foils 5, as shown by the metal foil 5.4 in the left-hand part of FIG. 1 which has stampings $4c$ and is braced against a flat rear cover sheet 7 of the cassette 3. An opposing cover sheet 8 of the cassette 3 is proviced on the front side thereof. In addition, the cassette 3 has a cover sheet generally identified as 9, and formed of a rear cover sheet part $9a$, a front cover sheet part $9b$ and an intermediate part $9c$ which, due to the stepped construction of the cassette 3, extends vertically and slightly curved in circumferential direction. The same applies to the bottom sheets of the cassette 3 which is generally identified as 10 and includes a rear bottom sheet part $10a$, a front bottom sheet part $10b$ and an intermediate part $10c$. The metal foils 5 in the interior of the cassette 3 can then be packaged in a thermally-displaceable arrangement to form the foil stack shown, the rear cover sheet 7 at the cold side K and the front cover sheet 8 at the hot side H both forming part of the stack. As will be explained in greater detail hereinafter the thus packaged metal foils 5 and the cover sheets 7 and 8 are held together in the position thereof by connecting means in a heat-elastic manner. The connecting means may be formed of external retaining clamps or of internal screw connections (with high thermal resistance); it is especially advantageous, however, to utilize the cover and bottom sheets for spot welding at the edges or the corners, as indicated at 11. By a "thermally displaceable" arrangement of the metal foils 5 there is meant that the metal foils 5 can expand without hindrance in the length and width thereof, if heated up, without thermal stresses being set up due to inhibited thermal expansion. The principal expansion directions that are to be considered are the vertical direction v and the circumferential direction h, as shown in FIG. 6. It is essential that during this thermal displacement, the sealing effect between adjacent metal foils 5 and also between adjacent cassettes 3 is not adversely affected. The invention provides an especially advantageous solution for this purpose which is suitable for manufacture. The metal foils 5 of the respective cassette 3 are provided at the edge or marginal zones thereof with elastically or resiliently deformable bends 12 at the upper side OS and the lower side US thereof (note especially FIG. 1). The bends 12 are of such shape and have such a shape elsticity that they can be deformed by the packaging pressure, which is represented schematically in FIG. $1a$ by an arrow P, to the spacing dimension 5 determined by the spacers 4 between respective adjacent metal foils 5, in this manner, the metal foils 5 packaged to form the cassettes 3 sealingly engage one another somewhat linearly with the bends 12 thereof. This packaged condition is shown in a partial view in FIG. $1a$ and is identified by the reference character I, whereas the relative position of the individual metal foils 5 in the yet unpackaged condition is shown in broken lines and represented by the reference character I'. In the not as yet packaged condition I', the mutual spacing a of the metal foils is determined by the shape of the edge or marginal bends 12. A respective metal foil 5 has therefore been displaced through this distance a in direction toward a respective adjacent foil 5 if it is pushed from the (not as yet packaged) position I' toward the adjacent foil 5 into the position I, elastically deforming the edge bends 12 thereof. Between every second metal foil 5, a spacing difference $2a$ is naturally produced, and between every third metal foil, a spacing difference $3a$ and so forth, if the stack of metal foils is compressed from the position I' into the position I.

FIG. $1a$ also shows that the bends 12 are formed by forming angles twice with an approximately V-shaped cross section in such a manner that the respective outer V-leg $12b$ is deformable by the packaging pressure P in such a manner that it comes to lie aapproximately planar parallel to the plane of the foils 5 (note the position 1).

For the sealing lines 12a to be formed in the packaged condition I, the projection of the outer V-leg 12b onto the foil plane must overlap the planar foil region in the not as yet packaged condition I. This can be achieved by providing that the outer V-leg 12b be, respectively, longer than the inner V-leg 12c or by dimensioning the edgewise angle α, which is formed by the outer V-leg 12b with the inner V-leg 12c in the not as yet packaged condition I'. A result thereof is that, when packaged, the flat parts of the metal foils 5 are always superimposed on the outer V-leg 12b and can deform the latter during the packaging into the elastically deformed position I.

In the packaged condition (not especially FIG. 1), the metal foils 5 then tightly engage one another with the spacers 4 thereof and, on the other hand, with the edge or marginal bends 12 thereof, they elastically and heat-sealingly engage one another somewhat linearly, the contact pressure in the region of the sealing lines 12a being adjustable by the degree of elastic deformation. If an especially stiff metal foil package is desired, the spacers can also be arranged, as is indicated in FIG. 1 at 4d, so that they are not mutually offset with the stampings thereof but are disposed in mutual alignment with an interposition of the planar metal foils 5.3. Through the illustrated, especially advantageous cassette construction, with a cover sheet 9 and a bottom sheet 10, additional sealing lines 12d between the edge or marginal bends 12 i.e. between the apex of the V-legs on the one side and the inside of the cover sheet 9 or the bottom sheet 10 on the other side, are provided, as is shown more clearly in FIG. 3 than in FIG. 1. Thereby, a fourfold convection barrier per cassette 3 is obtained, namely, the doubly staggered sealing lines 12d and 12a on the underside US of the cassette 3 and, likewise, the double staggering of the sealing lines 12a and 12d at the upper side OS of the cassette 3. As mentioned at the outset hereinbefore, marked blockage of the so-called internal convection is achievable beforehand by the sealing lines 12a of a metal foil stack which, in this case, forms a panel; it is especially advantageous, however, to provide a cover or bottom sheet 9, 10 with the further sealing lines 12d, at least at the upper or underside, thereby forming a cassette, and it is even more advantageous and preferably applicable for the thermal insulation in reactor pressure vessels to provide the cassettes with sheets 9 and 10 both at the cover side as well as at the bottom side thereof, as depicted by the illustrated embodiment.

Figure 2:
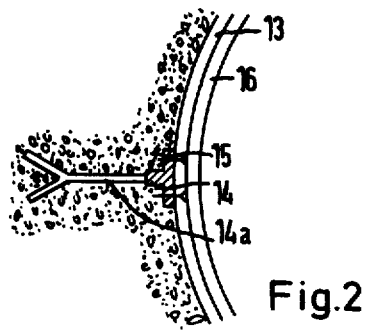
FIG. 2 is a cross-sectional view of FIG. 1 taken along the line II—II in direction of the arrows.
Figure 1A:
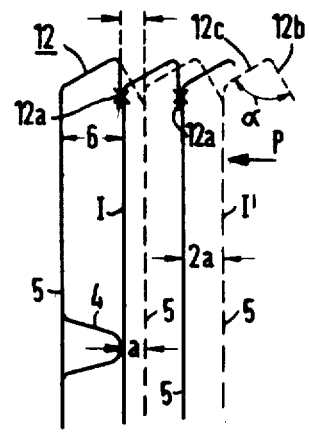
FIG. 1a is an enlarged fragmentary view of FIG. 1 showing schematically the elastic or resilient change of shape of the edge bends of the individual metal foils, if they are deformed by the packaging pressure from a loosely stacked condition I' to a final position I thereof.

The inner part r1 of the annular gap r in FIG. 1 between the insulation MF and the reactor pressure vessel 1 is left as an inspection ring gap, into which, for example, ultrasonic test system carriers belonging to remotely operated manipulators are insertable, and by means of which the outer periphery 1a of the reactor pressure vessel 1 can be inspected. The fastening of the cassettes 3 to the inner periphery 2a of the biological shield 2 is effected (note FIGS. 1 and 2) by shooting the cassettes 3 with welded-on mounting lugs 13 in the vicinity of the upper side OS thereof (note also FIG. 3) to vertical mounting bars 14 of the biological shield 2 by means of bolts 15. The mounting or holding lugs 13 are offset so that they form together with the rear cover sheet 7 for receiving therein projecting sealing edges 7a of the cover sheets 7. FIG. 2 shows in cross section the manner in which the mounting rails 14 are anchored in the biological shield 2; the rails 14 are provided with anchors 14a welded thereto which have a somewhat Y-shaped profile, and are cast with these anchors 14a in the biological shield 2. As also shown in FIG. 5, the holding legs 13 are provided with such an overlap 13' beyond the cover sheet part 9a, that the bolt 15 can be shot in radially from the front by means of a suitable shooting device. Two bolts 15 are provided for each cassette 3, each of the bolts 15 being anchored in a respective flange-half of the mounting rail 14. The mounting lugs 13 per se are offset at right angles at the lower end thereof and connected with the angle leg 13a thereof to the rear cover sheet 7, preferably by means of spot welding (welded joint 13b). The rear cover sheet 7, which serves as the lowermost or the uppermost layer during the packaging, is provided in the bottom-side and top-side edge or marginal region thereof with spacer bends 7b which, together with the cover sheet 7, forms a somewhat U-shaped profile. This second group of bends 7b serves, in one respect, as spacers in the edge or marginal region with regard to the adjacent metal foil 5. These bends 7b further form, with the upper leg 7b1 thereof, at the same time, a contact surface for the cover sheet 9 or the sheet part 9a thereof, so that the spot-welded joints 11 can be formed there. In the case of the other cover sheet 8 (on the front sides), which, during the packaging, accordingly forms the uppermost or the lowermost layer, separate angular edge or marginal bends 8a are provided, to which the other end of the cover sheet parts 9a can be connected by spot welding (welded joint 11). This also applies correspondingly to the lower side US of the bottom sheet 10 which is welded at the cold side K to the edge or marginal bend 7b1 of the rear cover sheet 7. On the hot side H, however, the bottom sheet part 10b, and not the front cover sheet 8, is provided with an angular edge or marginal bend 10b1, to which the cover sheet 8, which is planar in this region, is likewise connected by spot welding at 11 (FIG. 1).

A further spot-welded joint 11 is provided between the bend 9c1 of the intermediate sheet 9c and the cover sheet 9a.

During manufacture of the individual cassettes 3, one can proceed, for example, by stacking the individual metal foils one above the other within a template, within which the cover sheet 9 and the bottom sheet 10 have been previously fastened, and that then the packaging pressure is applied and the metal foils are compressed with elastic deformation of the bends 12 thereof, the spot-welded joints 11 which serve as the connecting means, then being effected.

As mentioned hereinbefore, the U-shaped mounting lugs 13 serve not only for fastening the cassettes 3, but also for sealing the same through mutual engagement of the projecting sealing edges 7a and the U-shaped pockets 16. In a corresponding manner, sealing engagement between projecting sealing edges 8a of the lower end of the front cover sheets 8 and associated receiving pockets 17 is also provided on the hot side H; the pockets 17 being formed, for example, by spot-welding, suitably offset strips 17a. A third group of U-shaped receiving pockets 18 and corresponding projecting sealing edges 19 is provided at the long sides of the cassettes 3 in accordance with FIG. 5, so that, therefore, mutually adjacent cassettes 3 in peripheral or circumferential direction, with the sealing edges 19 thereof and U-shaped receiving pockets 18 thereof, engage one another. This ensures an effective labyrinth-edge or margin seal, which prevents upward heat flow or convection, also in the case of laterally open cassettes.

Figure 3:
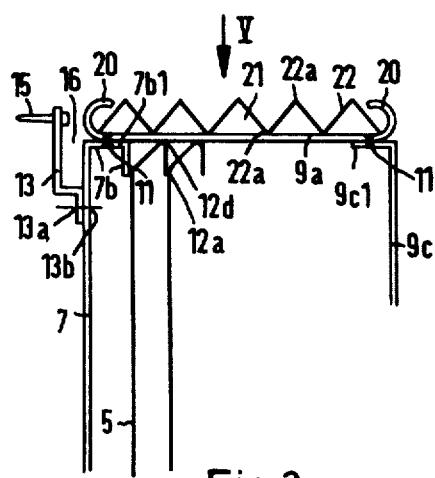
FIG. 3 is an enlarged fragmentary view of FIG. 1 showing the detail X.

As is shown especially in FIG. 1 in conjunction with FIG. 3, the bottom and cover sheets 9 and 10 are provided with further bends 20 on the sheet sides thereof situated at the cold and hot sides, the bends 20 being bent inwardly and towards one another in such a manner that receiving troughs 21 for corrugated-metal intermediate layers 22 are formed. These corrugated or wave-shaped sheet metal intermediate layers (or inserts) 22 are elastically deformable and, with the wave modes 22a thereof, linearly engaging the respective upper and lower cassettes 3, form an effective seal for the horizontal gaps 23 which are, respectively, provided between superimposed cassettes 3. These gaps 25 serve, on the one hand, to equalize tolerances and, on the other hand, permit thermal expansion of the cassettes 3, thermally elastic sealing being ensured through the corrugated or wave-shaped sheet metal sealing elements 22.

In the interest of clarity, the inner metal foils 5 have been omitted in FIG. 5. FIG. 5 is a perspective view of an individual cassette 3 and the mounting therefor. It is also especially apparent therefrom that the cassette 3 is stepped at the bottom and the cover sides thereof and, in the assembled condition thereof, the stair-like projections 24 of the one cassette engage in corresponding stair-like setbacks 25 of the respective cassette disposed thereabove. The projections 24 are, respectively, disposed on the upper side thereof and the setbacks 25 on the bottom side thereof. Due to this step-like construction, additional stair-like projections 26 are provided at the underside of the cassette and stair-like setbacks 27 at the upper side of the cassette. In assembled condition (note FIG. 1), the cassettes 3 engage one another with the projections 24, 26 and setbacks 25, 27 thereof, alternatingly in a form-locking manner, this form-locking engagement being further aided by the inter-engagement of the U-shaped pockets and corresponding sealing edges of the first group 72, 16, of the second group 8a, 17 and of the third group 19, 18.

FIG. 6 shows diagrammatically the frame 29 formed of longitudinal or mounting rails 14 and ring rails 38, and which is anchored at the inner periphery of the biological shield for mounting the entire metal foil insulation MF.

Figure 7:
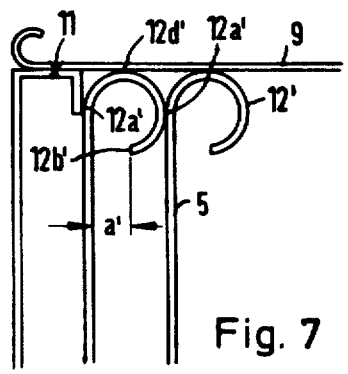
FIG. 7 is an enlarged fragmentary view of FIG. 3 showing another embodiment of the metal-foil insulation with rolled-in elastic edge bends of the metal foils.
Figure 4:
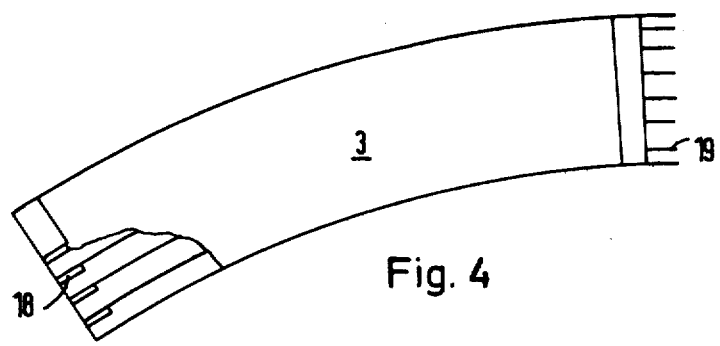
FIG. 4 is a top plan view of an individual cassette as seen in the direction V in FIG. 3.

FIG. 7 shows a modified embodiment of inwardly rolled edge or marginal bends 12', where the inwardly rolled portion amounts to about ¾ of the circumference of a circle. In this case, too, a linear sealing contact 12a' between mutually adjacent metal foils 5 and 12d' located between the outer periphery of the bends 12' and the underside of the cover sheet 9 or the top side of the bottom sheet 10 (not shown in FIG. 7) is provided. Due to the elastic deformation of the bends 12', a prestressing is furthermore produced in the built-in condition of the metal foils 5 within the cassette 3, analogously to the first-described embodiment herein. In the embodiment according to FIG. 7, however, the edge or marginal bends are somewhat more expensive to produce than in the first-mentioned embodiment. Advantageous values for the circumference of the inwardly rolled portions 12' are ½ to ¾ of the circumference of a circle in not as yet prestressed condition, so that there is sufficient distance a' of the edge or marginal end 12b' to the plane of the corresponding metal foil 5, and the edge or marginal bend 12' can therefore be deformed to the desired degree during packaging.

Figure 8:
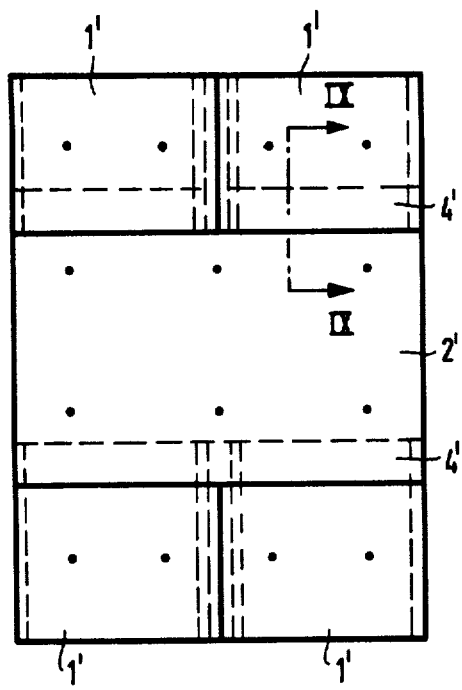
FIG. 8 is a fragmentary top plan view of a third embodiment of the invention with cassettes, the metal foils of which are fastened at the upper ends thereof, especially by welding, but stand up loosely and heat-elastically at the lower ends thereof.
Figure 9:
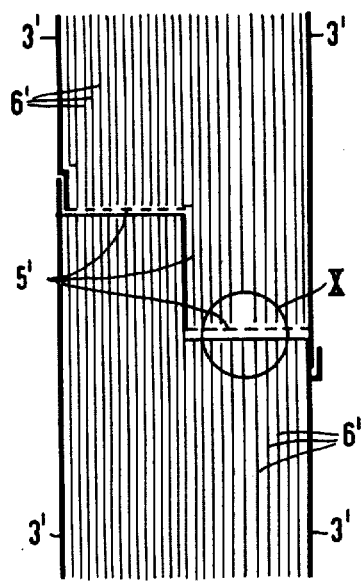
FIG. 9 is an enlarged cross-sectional view of FIG. 8 taken along the line IX—IX in direction of the arrows.
Figure 10:
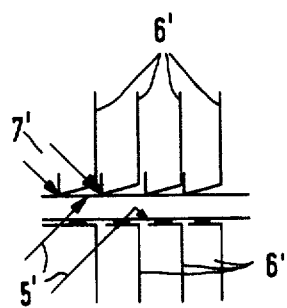
FIG. 10 is an enlarged fragmentary view of FIG. 9 showing the detail X'.

In a third embodiment of the invention shown in FIGS. 8 to 10, the metal foil insulation is made up of individual insulating elements in cassette form (note FIG. 8), which are assembled accordingly. For the vertical connection of the upper or lower elements 1', the hereinafore described connecting possibilities are provided, a step-like construction being provided also on the top and bottom side for horizontally connecting the middle cassette 2' to the upper and lower cassettes 1'.

The individual cassettes have outer cover sheets 3' and have, at the upper and lower end faces thereof, a step-shaped fold 4', a suitable step-shaped sheet 5' serving for confining this fold 4'.

Within the cassette i.e. between the outer sheets 3' thereof, a multiplicity of metal foils 6' are disposed spaced from one another and suspended at the top thereof from the sheet 5' and standing loosely at the bottom thereof in the form of a sliding seat. In the illustrated embodiment of FIGS. 8 to 10, these foils 6' are formed with an angle at the top thereof in the shape of an L and are tightly fastened with the thus formed horizontal leg of the L to the sheet 5', for example, by welding. At the bottom, these foils 6' are folded over in V- or U-shaped manner, the width of this U or V corresponding to the desired mutual spacing of two adjacent foils (spacer function). In addition, the foils are formed with angles at this end thereof in a manner that the edge or corner 7' thereof facing away from the main foil surface stands upright on the step-shaped sheet 5'.

Through the suspended disposition of the individual foils in the framework of such cassettes, the structural expense required can be reduced considerably, and also with this last-mentioned embodiment, the prevention of heat convection within the individual chambers of a cassette is ensured. Additional stabilization within the foil package is furthermore achieved by the provided angle at the top of the foils while, at the bottom thereof, the required sealing is attained due to the loose upright standing (sliding seat), and within the capability or limit of this sliding seat, length equalization of the foil sheet is assured, so that the latter cannot warp or bulge due to the thermal stresses. Because of the fastening means provided at the top of the foils, additional spacers may be placed lower, thereby contributing to a considerable simplification of the structure.

There is claimed:

1. Metal-foil insulation formed of a multiplicity of substantially rectangular-shaped, air-enclosing metal foils disposed laterally adjacent and above one another and provided with spacers therebetween, the metal foils being packageable in thermally displaceable relationship into panels with connecting means for maintaining the foils in packaged condition, the panels, in turn, being mutually alignable with sealable joints in a plurality of coordinate directions, comprising bends formed in marginal zones of at least one side of an upper and a lower side of the metal foils in the respective panels, said bends having a shape and a shape elasticity such as to be deformable by a packaging force to a spacing between mutually adjacent metal foils determined by the spacers therebetween, the metal foils packaged into the respective panels being disposed with said bends thereof substantially linearly and sealingly engaging one another, the panels being formed as cassettes closed at one side at least of an upper and a lower side thereof by at least one sheet of a cover and a bottom sheet, said cassettes being open at the sides thereof, said bends of the metal foils being disposed on at least one side of a cover and a bottom side thereof and, in packaged condition of said cassettes, being movable into engagement linearly and sealingly with inner sides of said at least one sheet of said cover and said bottom sheets.

2. Insulation according to claim 1 wherein said cassettes, respectively have, projecting foil edges at one of the elongated sides thereof, and foil pockets at the opposite elongated side thereof, the projecting foil edges of one of said cassettes being received in the foil pockets of a cassette adjacent to said one cassette.

3. Insulation according to claim 2 wherein said foil pockets have a U-shaped cross section.

4. Insulation according to claim 1 wherein said bends are formed with double angles and have a substantially V-shaped cross section, an outer leg of the V, respectively, being deformable by said packaging force so as to be disposed substantially planar parallel to the plane of the respective metal foil.

5. Insulation according to claim 4, wherein said outer leg of the V is longer, respectively, than the inner leg thereof, said outer leg extending at such an angle to said inner leg that a projection of said outer leg onto the respective foil plane in the as yet non-packaged condition of the respective cassette overlaps the planar region of the respective foil.

6. Insulation according to claim 1, wherein said bends are inwardly rolled, the inward roll thereof constituting from substantially ½ to substantially ¾ of the circumference of a circle.

7. Insulation according to claim 6 wherein said cassettes at the front and rear thereof corresponding, respectively, to a so-called cold side facing a heat sink, and to a so-called hot side facing a heat source, are provided, respectively, with cover sheets, the cover sheet serving during said packaging as lowermost and uppermost layers being provided, in the bottom and top marginal region thereof, with spacer bends for the metal foils forming a first layer.

8. Insulation according to claim 7 wherein said spacer bends have a substantially rectangular U-shaped profile.

9. Insulation according to claim 8 wherein said cassettes have gaps therebetween, said cover sheets at least at one side of the front and rear sides of the cassettes being formed with projecting sealing edges and U-shaped receiving pockets cooperating therewith so as to alternatingly sealingly interengage with one another so as to seal said gaps.

10. Insulation according to claim 9 including elastically deformable corrugated sheet inserts introduced within said gaps.

11. Insulation according to claim 10 wherein at least one sheet of said cover and bottom sheets is formed with bends at sheet sides thereof disposed at said cold and said hot sides, said last-mentioned bends facing inwardly towards one another so as to form receiving pockets for said corrugated sheet inserts.

12. Insulation according to claim 11 wherein said at least one sheet of said cover and bottom sheets is connected to front and rear cover sheets.

13. Insulation according to claim 12 wherein the connection is by spot weldments.

14. Insulation according to claim 12 wherein said spacer bends serve as connecting region for the cover sheet forming the lowermost and uppermost packaging layer and, for the other cover sheet of a cassette, a separate marginal angular portion serves as connecting region.

15. Insulation according to claim 1 wherein said cassettes have step-shaped bottom and top sides forming stair-like projections and stair-like setbacks, respective stair-like projections and setbacks of pairs of adjacent cassettes alternatingly engaging one in the other.

16. Metal-foil insulation formed of a multiplicity of substantially rectangular-shaped, air-enclosing metal foils disposed laterally adjacent and above one another and provided with spacers therebetween, the metal foils being packageable in thermally displaceable relationship into panels with connecting means for maintaining the foils in packaged condition, the panels, in turn, being mutually alignable with sealable joints in a plurality of coordinate directions, comprising bends formed in marginal zones of at least one side of an upper and a lower side of the metal foils in the respective panels, said bends having a shape and a shape elasticity such as to be deformable by a packaging force to a spacing between mutually adjacent metal foils determined by the spacers therebetween, the metal foils packaged into the respective panels being disposed with said bends thereof substantially linearly and sealingly engaging one another, said foils being enclosed by sheets in cassettes closed on all sides thereof, said cassettes at upper and lower end faces thereof having a step-shaped fold, said foils at an upper sheet being sealingly fastened to an adjacent chamber and being loosely disposed upright below a step-shaped sheet of the fold.

17. Thermal insulation according to claim 16, wherein said foils are formed at the top thereof with an L-shaped angle and are secured by weldment at said step-shaped sheet of the fold, and foils being formed at the bottom thereof with a V-shaped angle.

18. Thermal insulation according to claim 16 wherein said foils at the bottom thereof are respectively formed with an edge located opposite the plane of the respective foil, said edge being engageable with said step-shaped sheet so as to form an upright "U" thereon.

* * * * *